US011388121B2

(12) United States Patent
Pfeffer et al.

(10) Patent No.: US 11,388,121 B2
(45) Date of Patent: *Jul. 12, 2022

(54) COMMUNICATION MANAGEMENT SYSTEMS AND METHODS

(71) Applicant: CHARTER SOLUTIONS INTERNATIONAL, Alpharetta, GA (US)

(72) Inventors: Thomas Pfeffer, Ball Ground, GA (US); Derek Beveridge, Cumming, GA (US); Vishrut Patel, Roswell, GA (US)

(73) Assignee: Amadeus North America, Inc., Doral, FL (US)

(*) Notice: Subject to any disclaimer, the term of this patent is extended or adjusted under 35 U.S.C. 154(b) by 332 days.

This patent is subject to a terminal disclaimer.

(21) Appl. No.: 16/442,364

(22) Filed: Jun. 14, 2019

(65) Prior Publication Data

US 2019/0306092 A1  Oct. 3, 2019

Related U.S. Application Data

(63) Continuation of application No. 15/297,090, filed on Oct. 18, 2016, now Pat. No. 10,361,977, which is a
(Continued)

(51) Int. Cl.
G06Q 10/10 (2012.01)
G06Q 30/00 (2012.01)
(Continued)

(52) U.S. Cl.
CPC ........ H04L 51/046 (2013.01); G06F 3/04817 (2013.01); G06Q 30/00 (2013.01);
(Continued)

(58) Field of Classification Search
CPC ....... H04L 51/046; H04L 51/32; H04L 67/18; G06F 3/04817; G06F 3/0482;
(Continued)

(56) References Cited

U.S. PATENT DOCUMENTS 5,948,040 A    9/1999  Delorme et al.
7,089,198 B2   8/2006  Freedenberg et al.
(Continued)

FOREIGN PATENT DOCUMENTS

GB    2501849 A      11/2013
WO    2012068266 A2   5/2012

OTHER PUBLICATIONS

Alabi, "Office Action issued in U.S. Appl. No. 13/545,260, filed Jul. 10, 2012", dated Nov. 16, 2012, 1-22.
(Continued)

Primary Examiner — Jonathan P Ouellette
(74) Attorney, Agent, or Firm — Thompson Hine LLP

(57) ABSTRACT

A computer system that is adapted for: (A) displaying a geographical map on a display screen; (B) displaying a plurality of icons on the geographical map, each of which generally represents the current location of at least one individual; (C) allowing a user to select a group of the icons; and (D) after the user selects the group of icons, providing messaging functionality for allowing the user to send a common message to the respective portable computing devices of at least substantially all of the individuals who correspond to the selected group of icons. In particular embodiments, the system allows the user to send the message by executing a single activity, such as selecting a single button. The system may also be configured to approximate the current location of an individual based on the individual's current travel itinerary.

18 Claims, 16 Drawing Sheets

Related U.S. Application Data continuation of application No. 13/545,260, filed on Jul. 10, 2012, now Pat. No. 9,477,961, which is a continuation-in-part of application No. 13/110,912, filed on May 18, 2011, now abandoned.

(60) Provisional application No. 61/414,308, filed on Nov. 16, 2010.

(51) Int. Cl.

| | | |
|---|---|---|
| *G06Q 30/06* | (2012.01) | |
| *H04L 51/046* | (2022.01) | |
| *G06Q 50/00* | (2012.01) | |
| *G06F 3/04817* | (2022.01) | |
| *G06Q 50/14* | (2012.01) | |
| *H04L 51/52* | (2022.01) | |
| *H04L 67/52* | (2022.01) | |
| *G06Q 90/00* | (2006.01) | |
| *G06Q 50/26* | (2012.01) | |
| *G06F 3/0482* | (2013.01) | |

(52) U.S. Cl.
CPC ............ *G06Q 50/00* (2013.01); *G06Q 50/14* (2013.01); *H04L 51/32* (2013.01); *H04L 67/18* (2013.01); *G06F 3/0482* (2013.01); *G06Q 50/01* (2013.01); *G06Q 50/265* (2013.01); *G06Q 90/20* (2013.01)

(58) Field of Classification Search
CPC ........ G06Q 50/14; G06Q 50/00; G06Q 30/00; G06Q 50/01; G06Q 90/20; G06Q 50/265
USPC .................................................. 705/1.1–912
See application file for complete search history.

(56) References Cited

U.S. PATENT DOCUMENTS

| | | |
|---|---|---|
| 7,590,548 B2 | 9/2009 | Meyer et al. |
| 7,899,692 B2 | 3/2011 | Caballero et al. |
| 9,477,961 B2 | 10/2016 | Pfeffer et al. |
| 2002/0145984 A1 | 10/2002 | Babu et al. |
| 2002/0165910 A1 | 11/2002 | Brown et al. |
| 2004/0103158 A1 | 5/2004 | Vella et al. |
| 2006/0270419 A1 | 11/2006 | Crowley et al. |
| 2007/0281689 A1 | 12/2007 | Altman et al. |
| 2007/0282621 A1 | 12/2007 | Altman et al. |
| 2008/0046478 A1 | 2/2008 | Mandre et al. |
| 2008/0109317 A1* | 5/2008 | Singh ................. G06Q 30/0254 |
| | | 705/14.5 |
| 2008/0177584 A1 | 7/2008 | Altaf et al. |
| 2008/0294469 A1 | 11/2008 | Caballero et al. |
| 2009/0012798 A1 | 1/2009 | McConnell et al. |
| 2009/0233629 A1 | 9/2009 | Jayanthi |
| 2010/0057502 A1 | 3/2010 | Arguelles et al. |
| 2011/0282680 A1 | 11/2011 | Pfeffer et al. |
| 2012/0278092 A1 | 11/2012 | Pfeffer et al. |
| 2012/0313780 A1 | 12/2012 | Stout et al. |
| 2017/0041258 A1 | 2/2017 | Pfeffer et al. |

OTHER PUBLICATIONS

Alabi, "Office Action issued in U.S. Appl. No. 13/545,260, filed Jul. 10, 2012", dated Oct. 9, 2013, 1-33.
Barrell, "Examination Report for GB1314661.8", dated Mar. 24, 2017, 7 pages.
Dedek, "Examination Report for EP 11842366.4", dated Jan. 27, 2017, 7 pages.
Dedek, "Extended European Search Report for EP 11842366.4", dated Oct. 28, 2015, 1-6.
Dedek, "Summons to attend oral proceedings pursuant to Rule 115(1) EPC, EP 11842366.4", dated Dec. 13, 2017, 12 pages.
Lee, "International Search Report and Written Opinion issued in International Application No. PCT/US2011/061017", dated May 30, 2012, 1-8.
Lindner, "International Preliminary Report on Patentability issued in International Application No. PCT/US2011/061017", dated May 21, 2013, dated May 21, 2013, 1-6.
McCormick, "Final Office Action issued in U.S. Appl. No. 13/110,912, filed May 18, 2011", dated May 18, 2015, dated May 18, 2015, 1-14.
McCormick, "Final Office Action issued U.S. Appl. No. 13/110,912, filed May 18, 2011", dated Feb. 26, 2014, 1-9.
McCormick, "Office Action issued in U.S. Appl. No. 13/110,912, filed May 18, 2011", dated Feb. 3, 2015, 1-14.
McCormick, "Office Action issued in U.S. Appl. No. 13/110,912, filed May 18, 2011", dated Jun. 19, 2013, 1-9.
Ouellette, "Final Office Action issued in U.S. Appl. No. 13/545,260, filed Jul. 10, 2012", dated Jul. 21, 2016.
Ouellette, "Final Office Action issued in U.S. Appl. No. 13/545,260, filed Jul. 10, 2012", dated May 5, 2015, 1-14.
Ouellette, "Office Action issued in U.S. Appl. No. 13/545,260, filed Jul. 10, 2012", dated Mar. 23, 2016, 1-10.
Ouellette, "Office Action issued in U.S. Appl. No. 13/545,260, filed Jul. 10, 2012", dated Jan. 27, 2015, 1-13.
Ouellette, "Office Action issued in U.S. Appl. No. 15/297,090, filed Oct. 18, 2016", dated Oct. 29, 2018, 5 pages.

* cited by examiner

Messaging                                                                    ✕

Message Type

○ Info message     [ ▼ ]

⊙ Feedback request    [ Do you need immediate assistance? ▼ ]

○ Location request

Request:

[ Do you need immediate assistance? ]

| | Option | Status change |
|---|---|---|
| 1: | YES | Red ▼ |
| 2: | NO | Green ▼ |
| 3: |  | None ▼ |
| 4: |  | None ▼ |
| 5: |  | None ▼ |

[ Send ]  [ Cancel ]

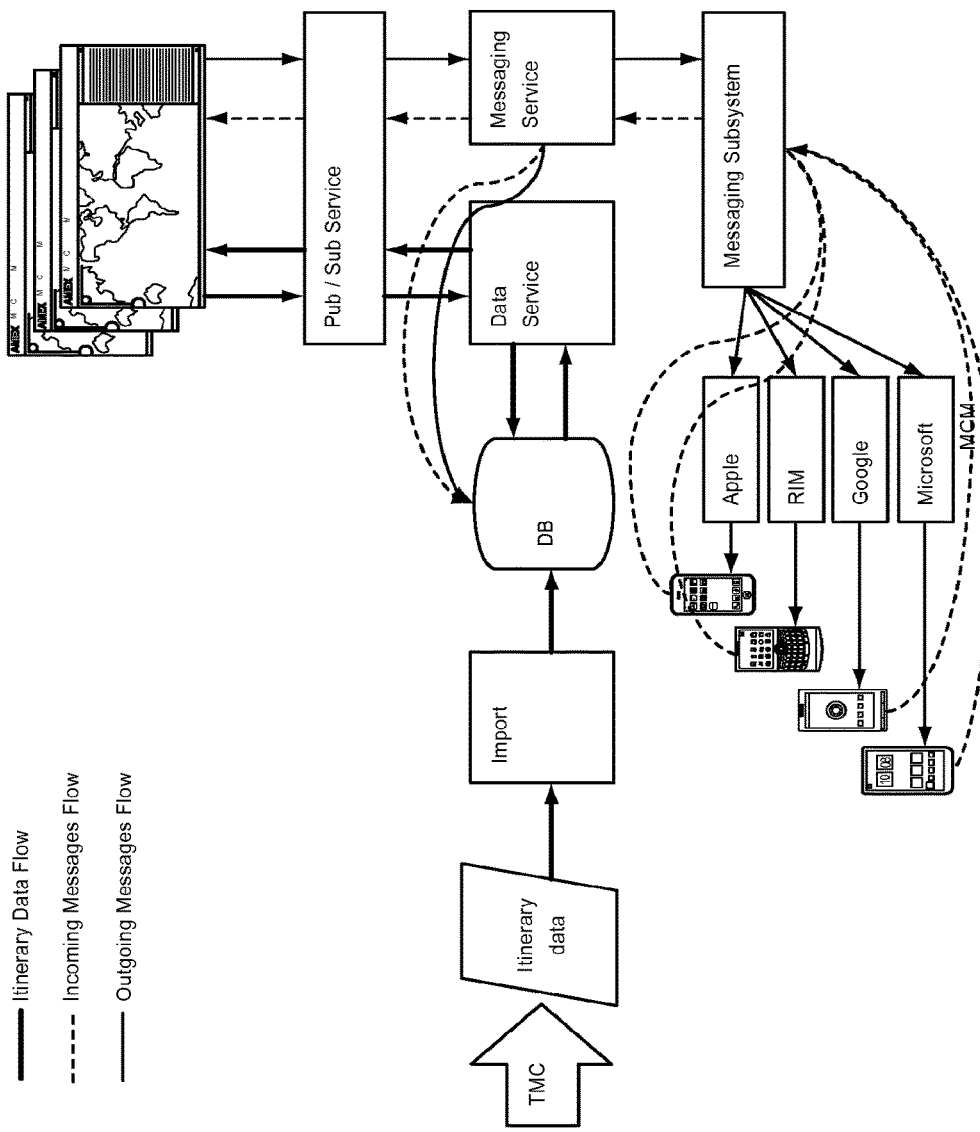

COMMUNICATION MANAGEMENT SYSTEMS AND METHODS

CROSS-REFERENCE TO RELATED APPLICATIONS

This application is a continuation of U.S. patent application Ser. No. 15/297,090, entitled "Communication Management Systems and Methods," and filed Oct. 18, 2016, which is a continuation of U.S. application Ser. No. 13/545,260, entitled "Communication Management Systems and Methods," and filed Jul. 10, 2012, which is a continuation-in-part of U.S. application Ser. No. 13/110,912, entitled "Communication Management Systems and Methods," and filed May 18, 2011, which claims the benefit of U.S. Provisional Application No. 61/414,308, entitled "Communication Management Systems and Methods," and filed Nov. 16, 2010. The entire contents of the above-identified priority applications are hereby fully incorporated herein by reference.

BACKGROUND

Modern business often requires travel. As a result, large organizations often face the potentially daunting task of simultaneously coordinating the travel of legions of sales representatives, executives, and other employees. Because travel arrangements can change due to unforeseen circumstances, such as natural disasters, terrorist threats, and canceled or delayed flights, it is often necessary to communicate with travelers in real time, while they are traveling. This is often done on an ad-hoc basis, which can be time consuming and labor intensive when many travelers are involved. Accordingly, there is currently a need for improved systems and methods for coordinating the travel of large groups of people.

SUMMARY

A communication management system according to various embodiments comprises: (1) a computer processor; and (2) a memory in communication with the computer processor, wherein the communication management system is adapted for: (A) displaying a geographical map on a display screen; (B) displaying a first icon in a first location on the map, the first icon representing at least a first particular individual, and the first location on the map corresponding at least generally to a current physical location of the first particular individual; (C) displaying a second icon in a second location on the map, the second icon representing at least a second particular individual, and the second location on the map corresponding at least generally to a current physical location of the second particular individual; (D) allowing a user to select a group of icons, the group of icons comprising both the first and second icons; and (E) after the user selects the group of icons (e.g., in response to the user selecting the group of icons), providing messaging functionality for allowing the user to send a common message to: (1) a first portable computing device associated with the first individual; and (2) a second portable computing device associated with the second individual.

A communication management system according to various embodiments comprises: (1) a computer processor; and (2) a memory in communication with the computer processor, wherein the communication management system is adapted for automatically approximating a location of a particular individual based, at least in part, on the individual's current travel itinerary.

BRIEF DESCRIPTION OF THE DRAWINGS

Figure 1:
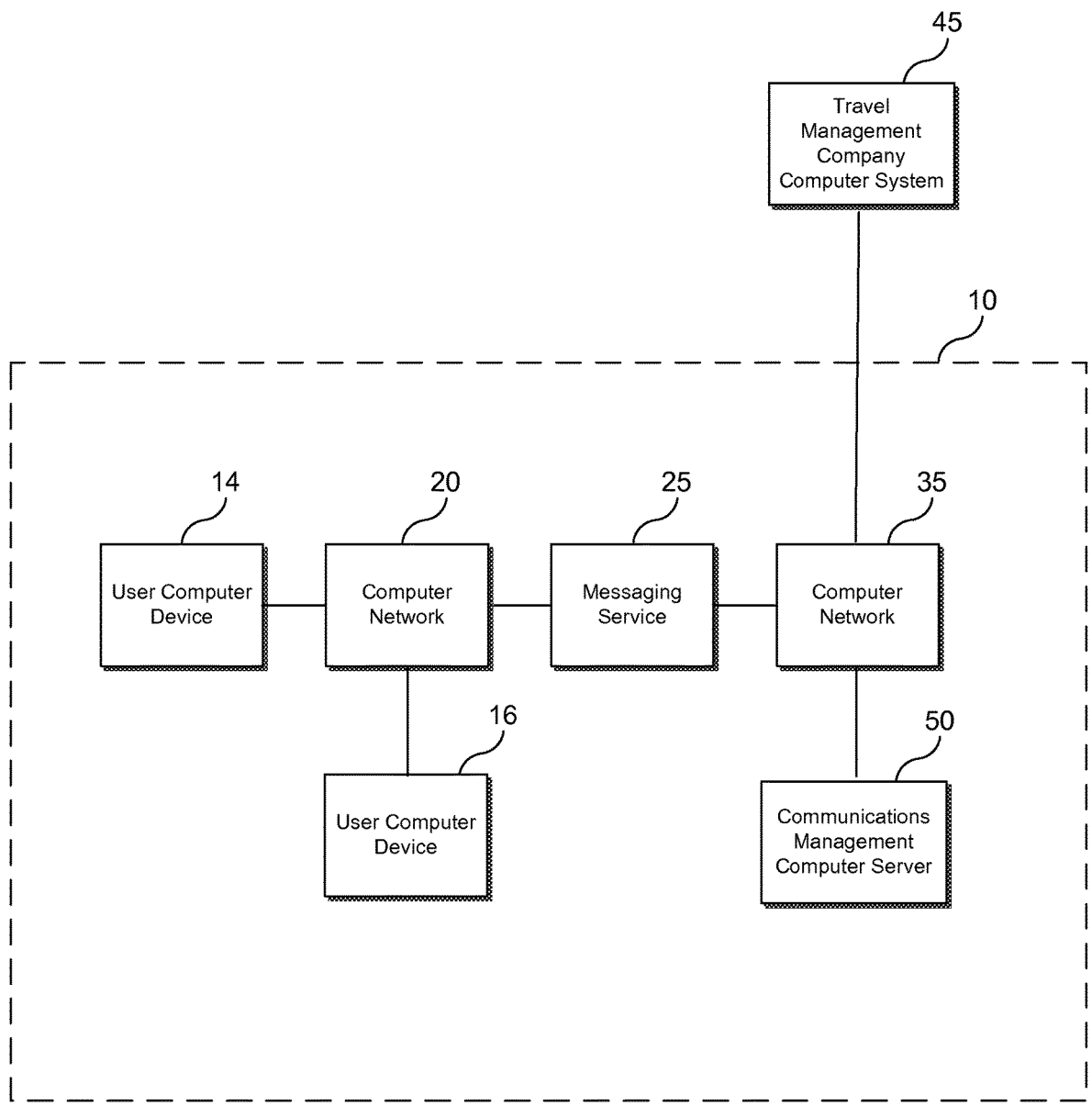

Having thus described various embodiments in general terms, reference will now be made to the accompanying drawings, which are not necessarily drawn to scale, and wherein:

FIG. 1 is a block diagram of a Communication Management Computer System according to a particular embodiment.

Figure 2:
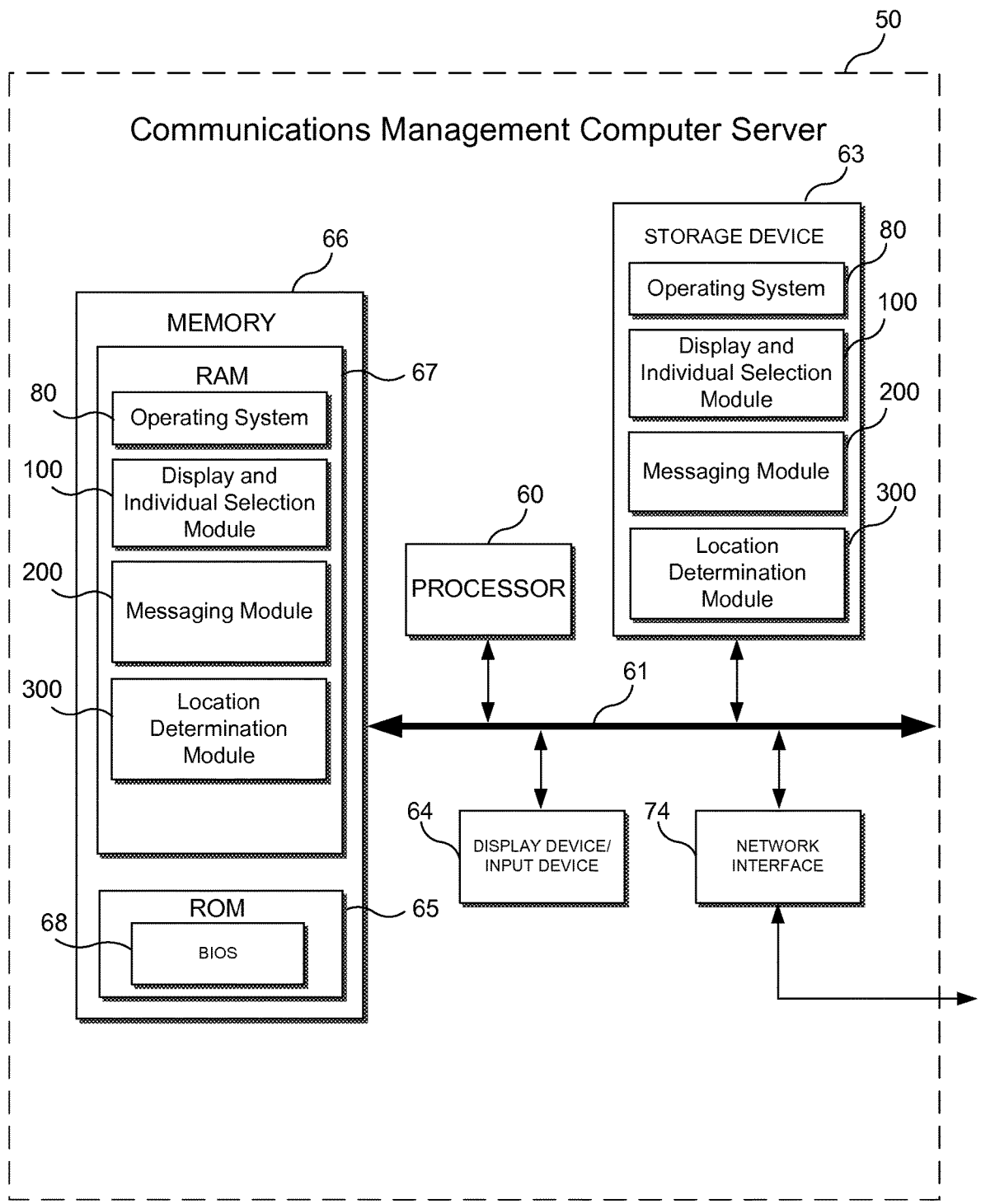

FIG. 2 is a block diagram of a Communication Management Computer Server according to a particular embodiment.

Figure 3:
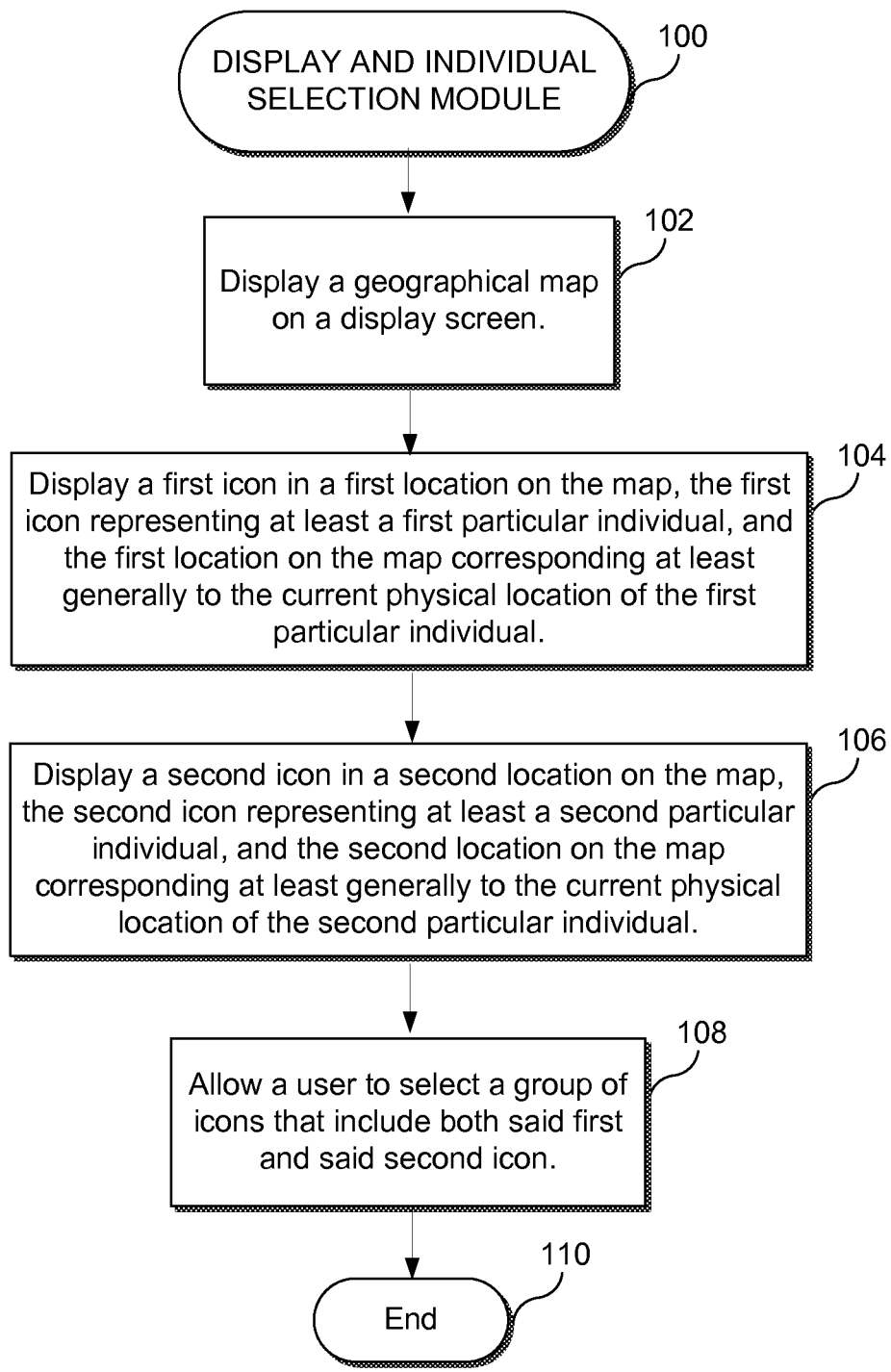

FIG. 3 is a flowchart that generally illustrates various steps executed by a Display and Individual Selection Module according to a particular embodiment.

Figure 4:
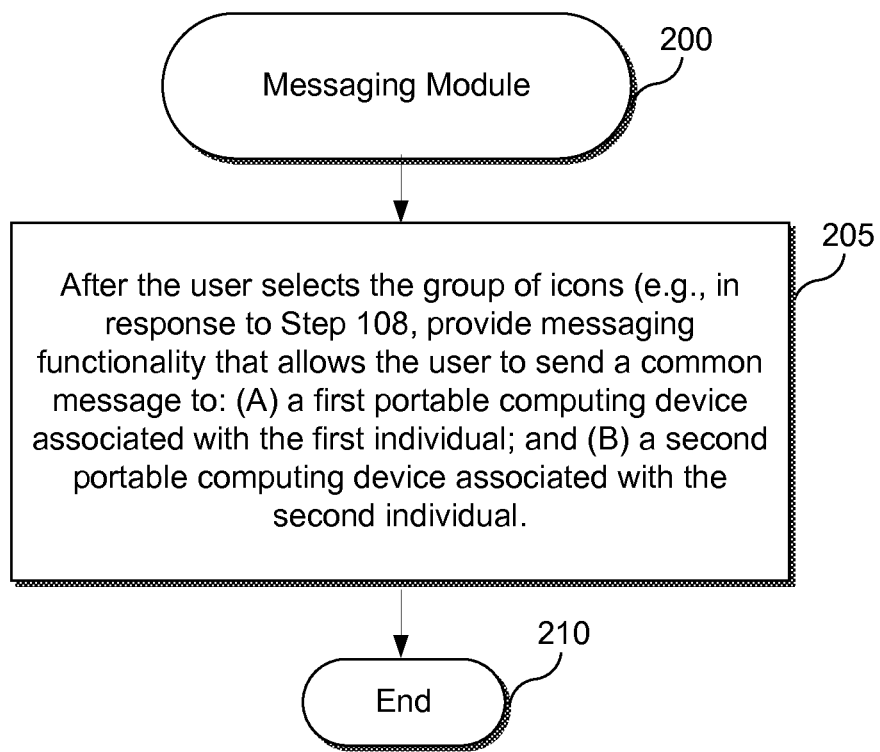

FIG. 4 is a flowchart that generally illustrates various steps executed by a Messaging Module according to a particular embodiment.

Figure 5:
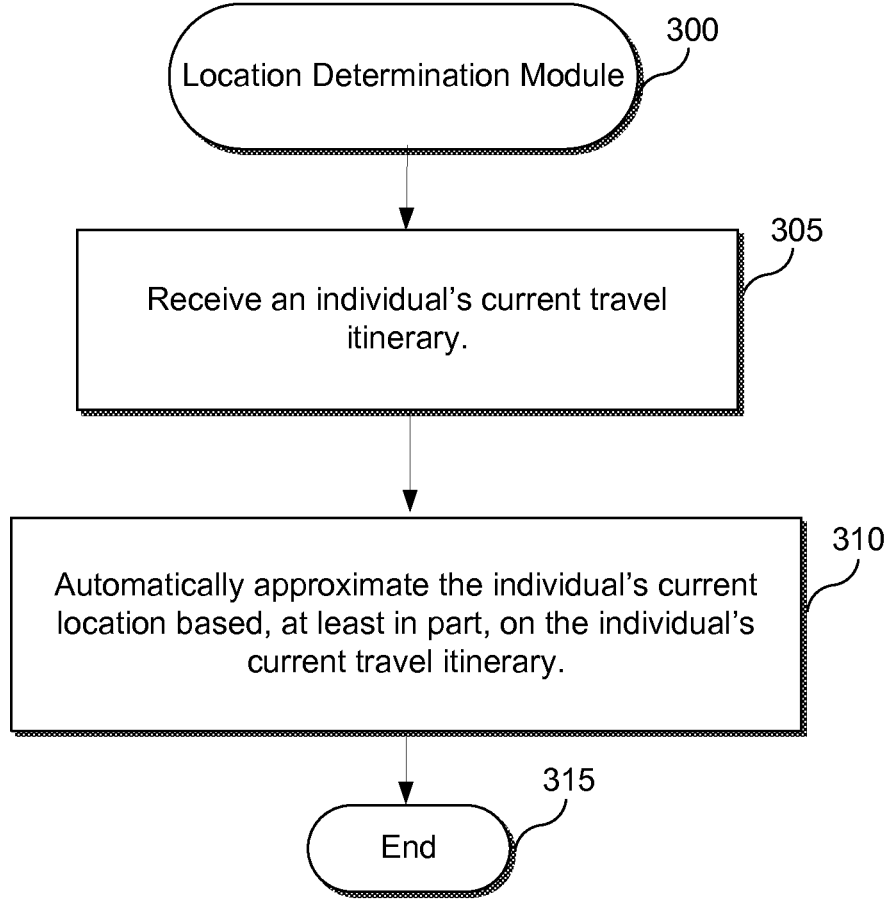

FIG. 5 is a flowchart that generally illustrates various steps executed by a Location Determination Module according to a particular embodiment.

Figure 6:
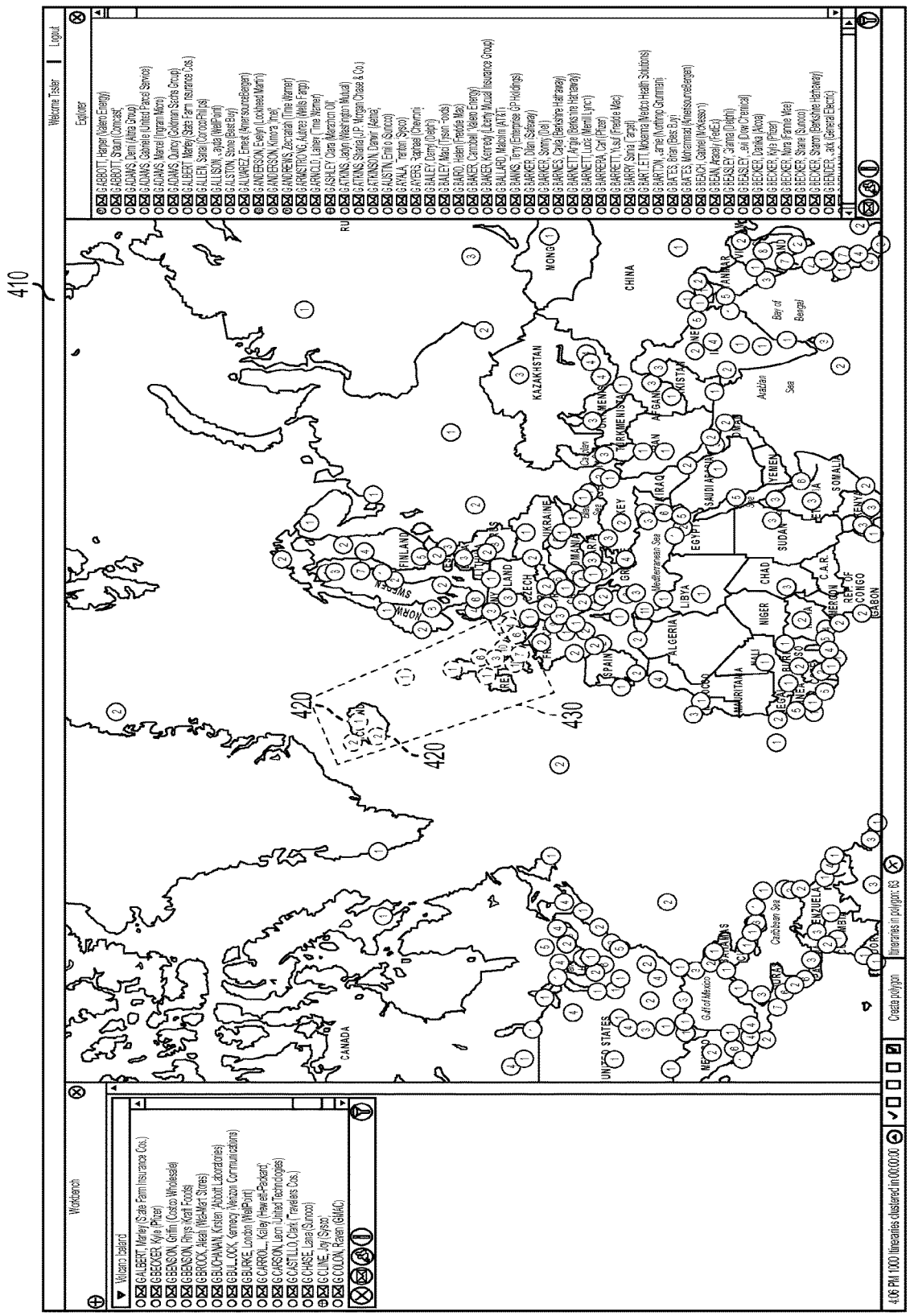

FIG. 6 is a first screen shot of a display of a computer system according to a particular embodiment.

Figure 7:
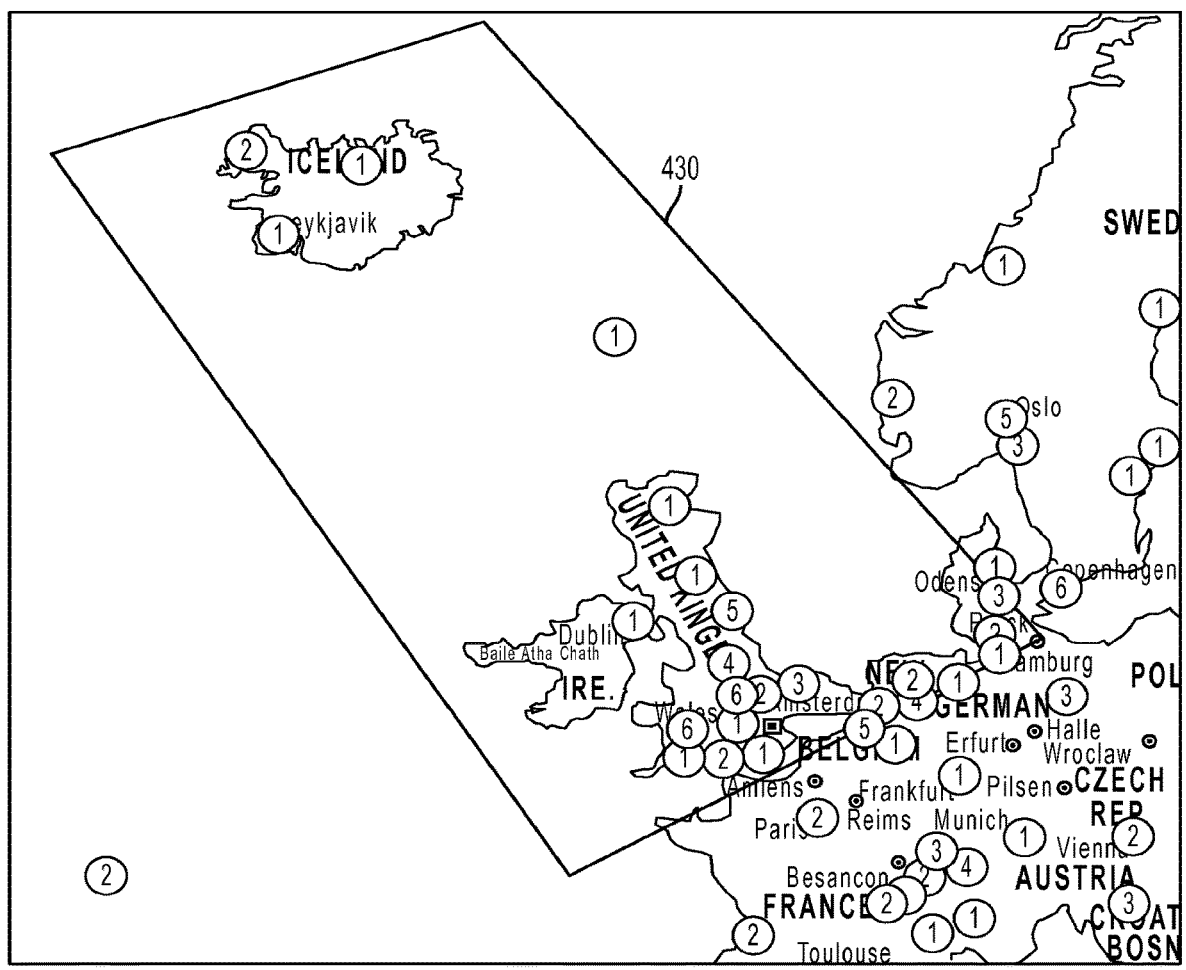

FIG. 7 is a close-up view of a central portion of the screen shot of FIG. 6.

Figure 8:
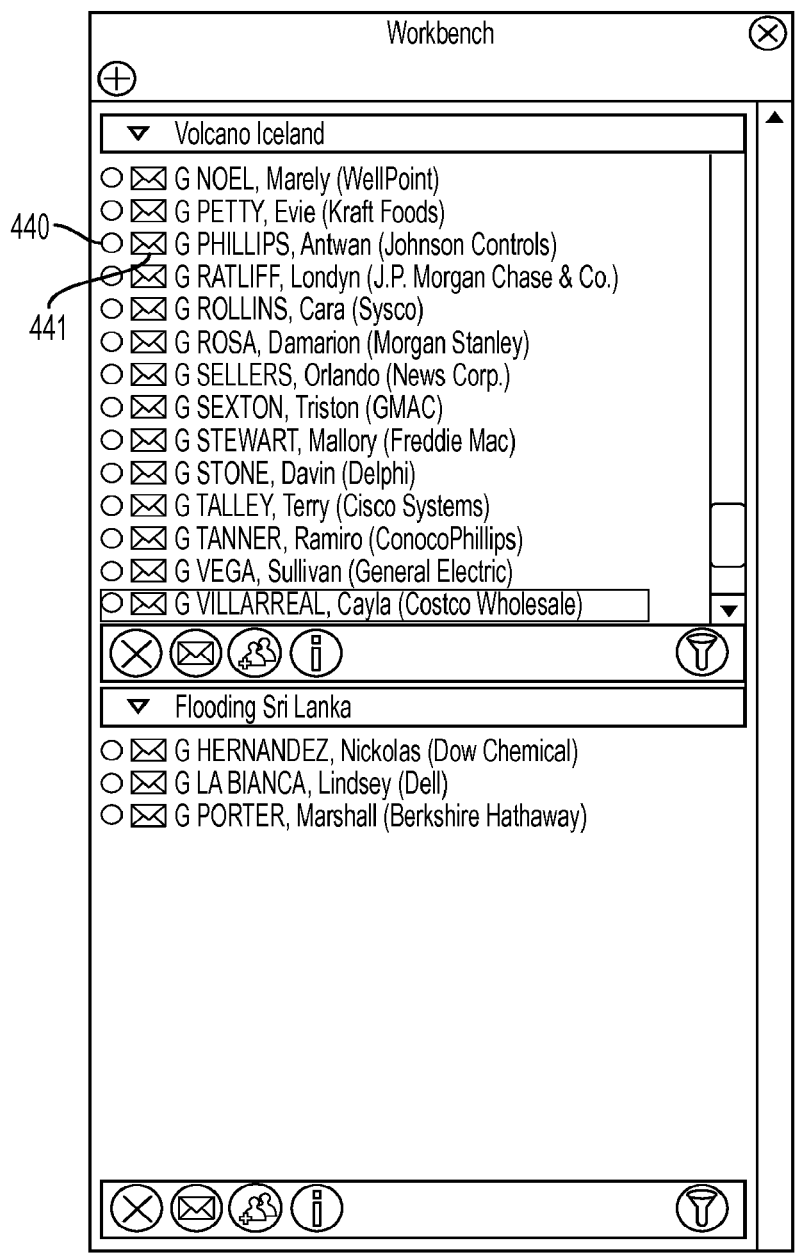

FIG. 8 is a close-up view that corresponds generally to the left "Workbench" panel of the screen shot of FIG. 6.

Figure 9:
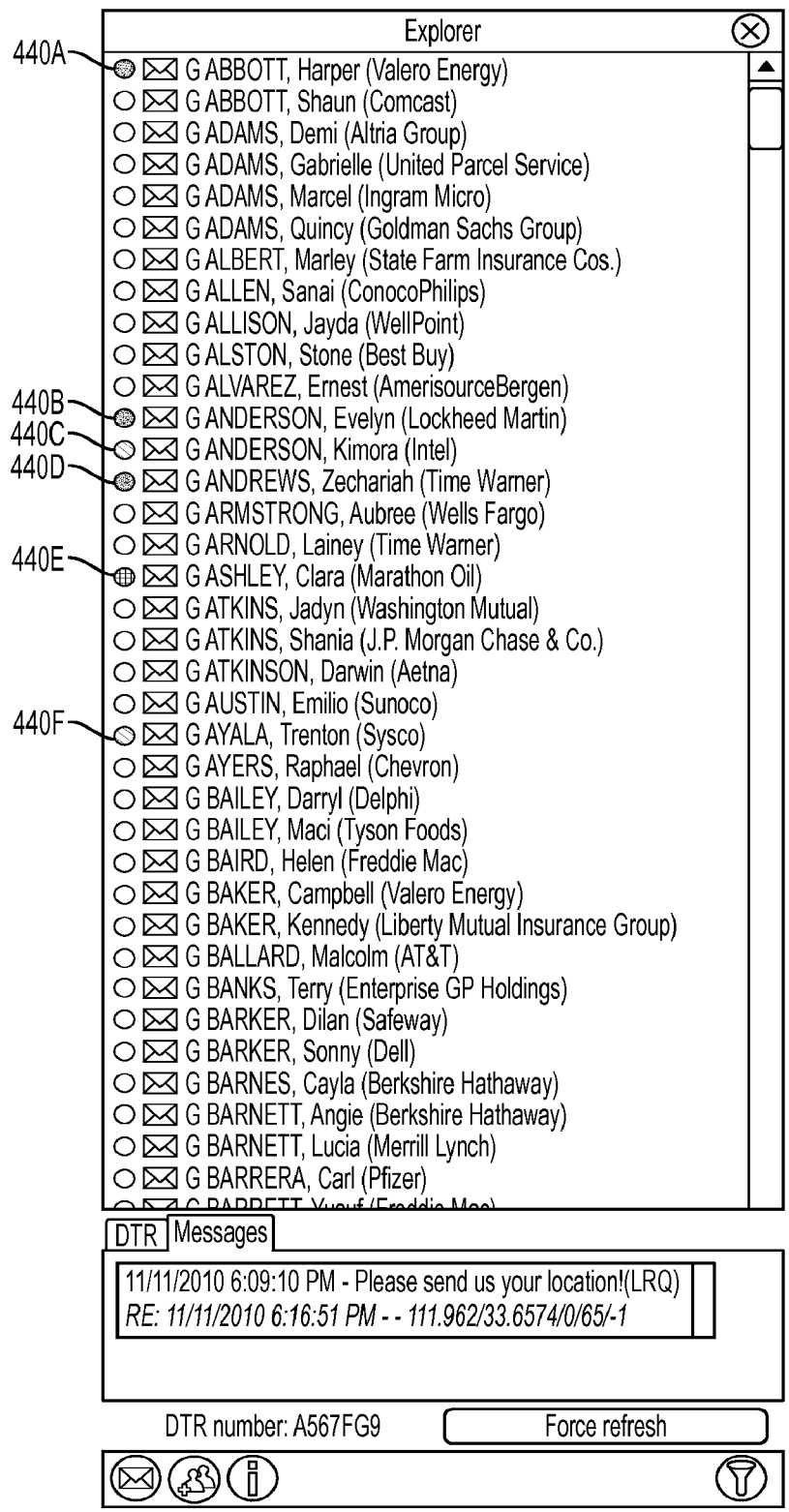

FIG. 9 is a close-up view that corresponds generally to the right "Explorer" panel of the screen shot of FIG. 6.

Figure 10:
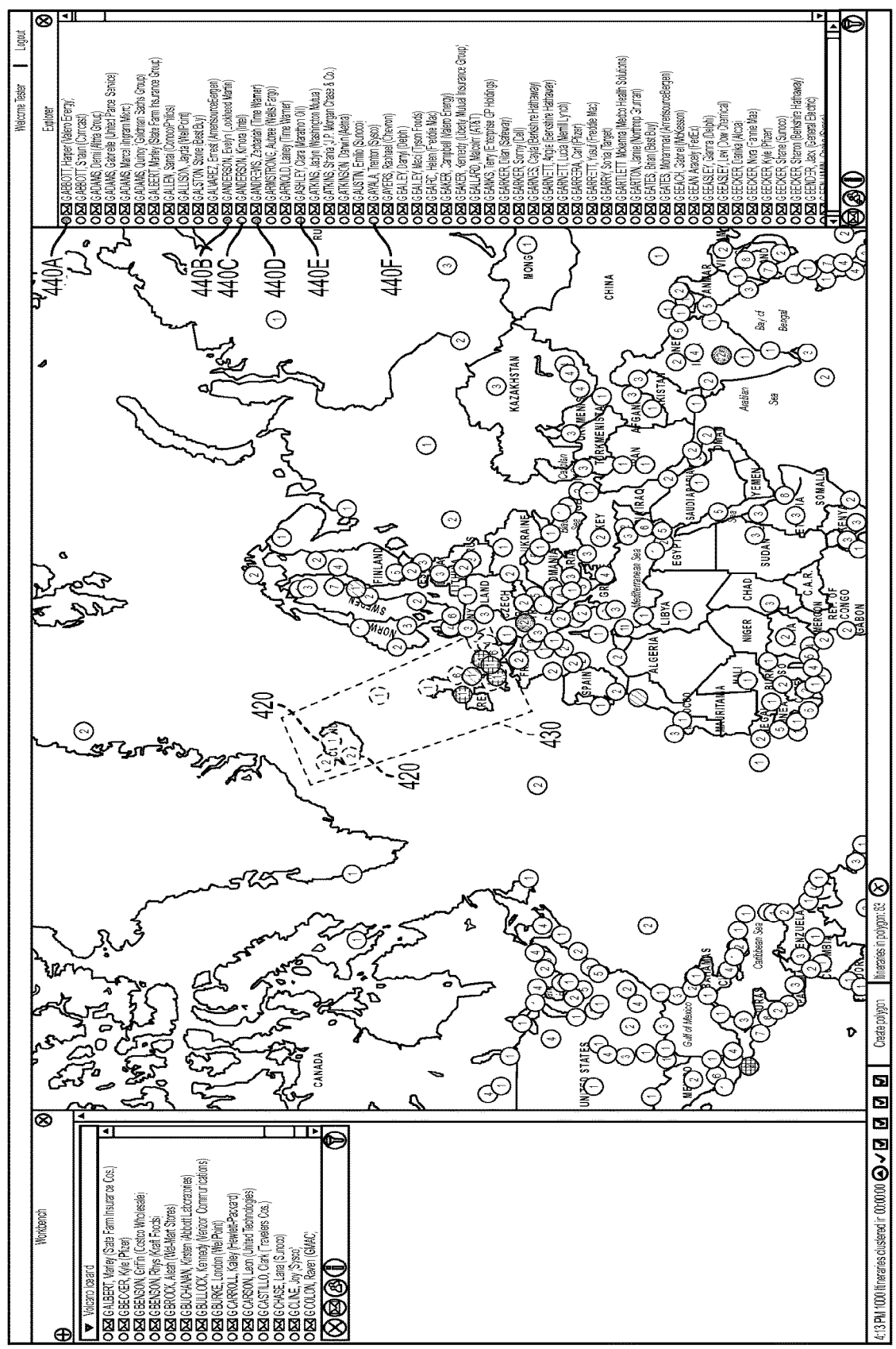

FIG. 10 is a second screen shot of the computer display of FIG. 6. The screen shot shown in FIG. 10 shows the display later in time than FIG. 6.

Figure 11:
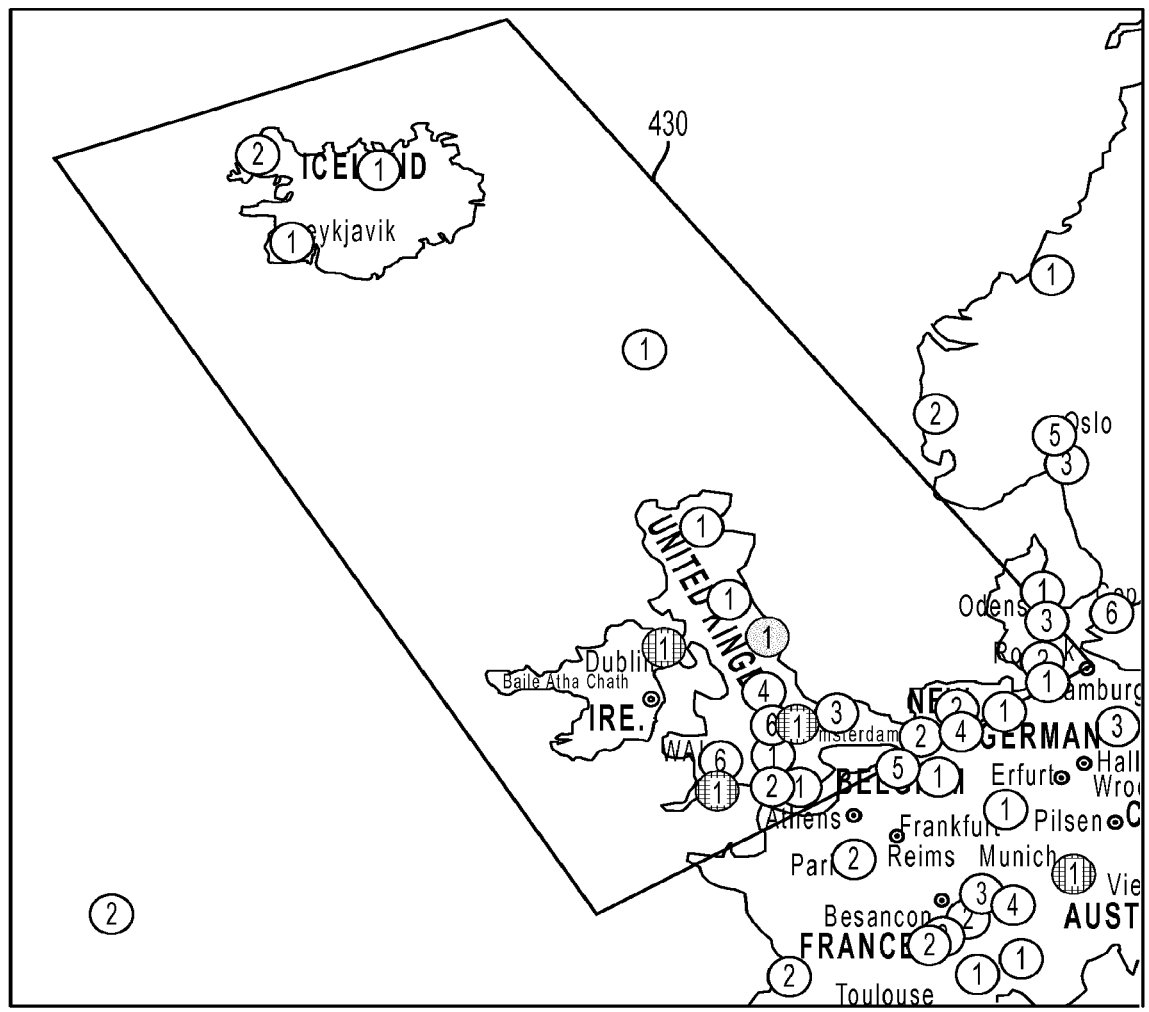

FIG. 11 is a close-up view that corresponds generally to the central portion of the screen shot of FIG. 10.

Figure 12:
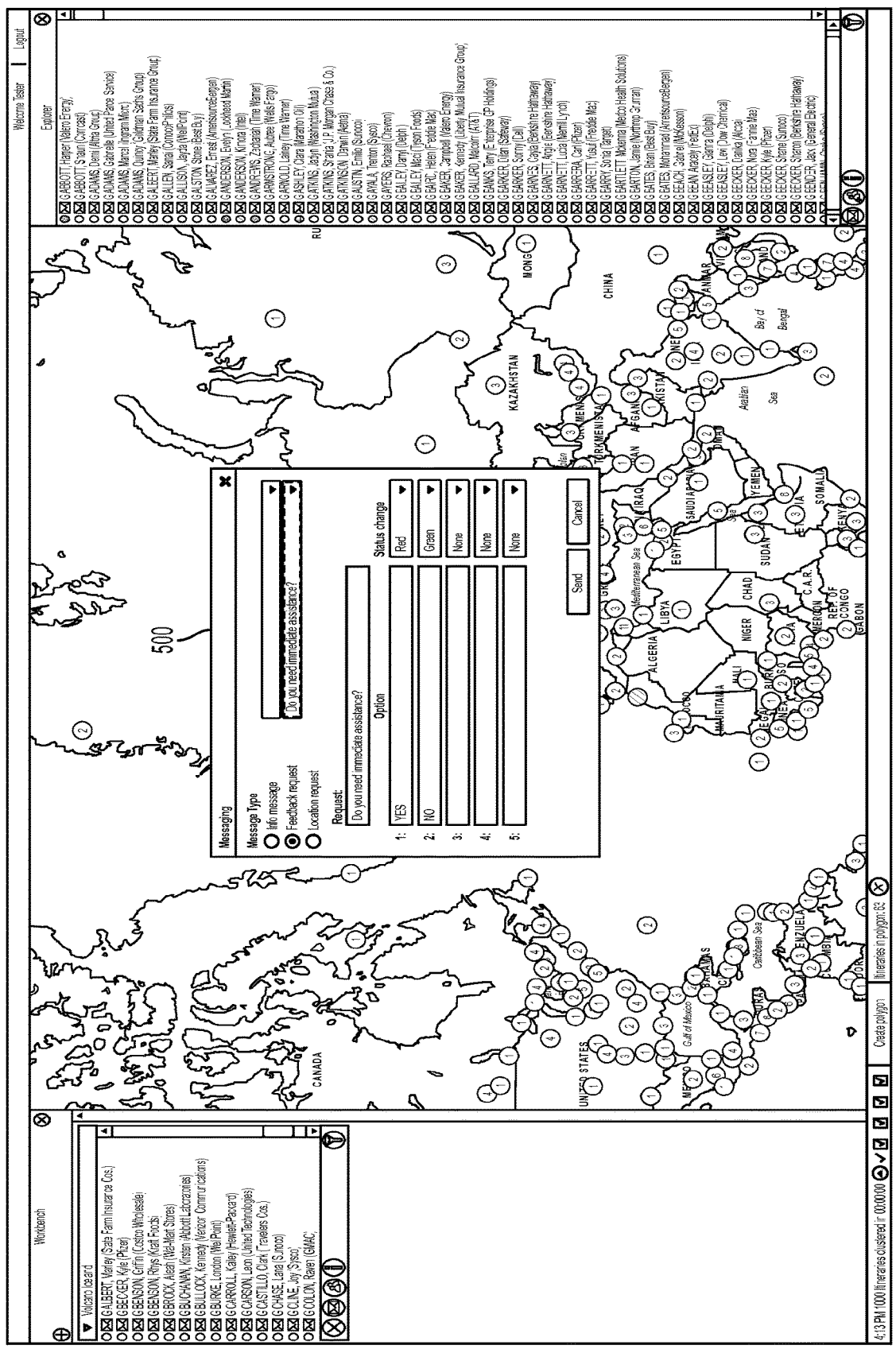

FIG. 12 is a third screen shot of the computer display of FIG. 6. The screen shot shows a messaging box according to a particular embodiment.

FIG. 13 is a close-up view of the messaging box of FIG. 12.

Figure 14:
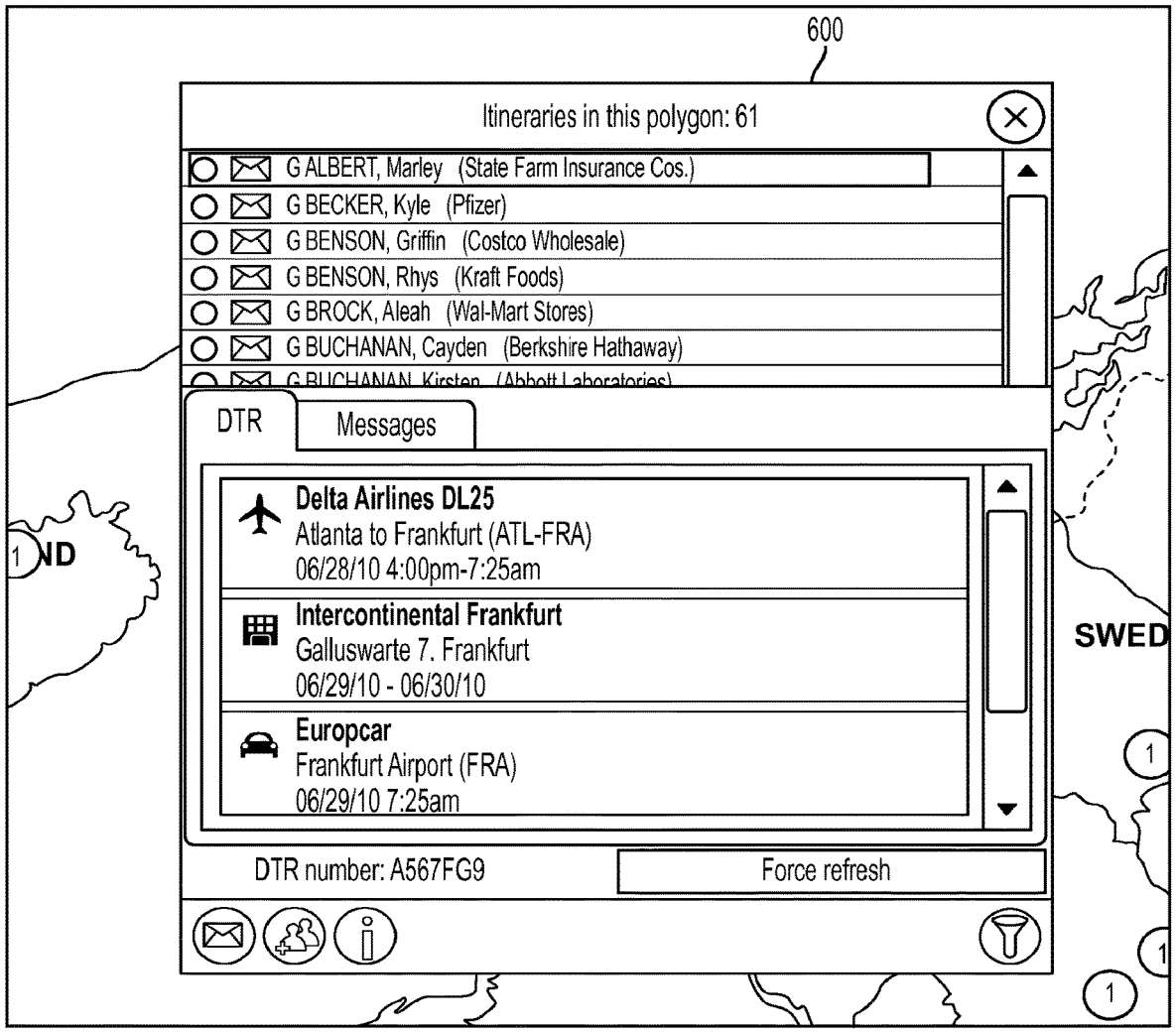

FIG. 14 is a first view of a polygon detail box according to a particular embodiment.

Figure 15:
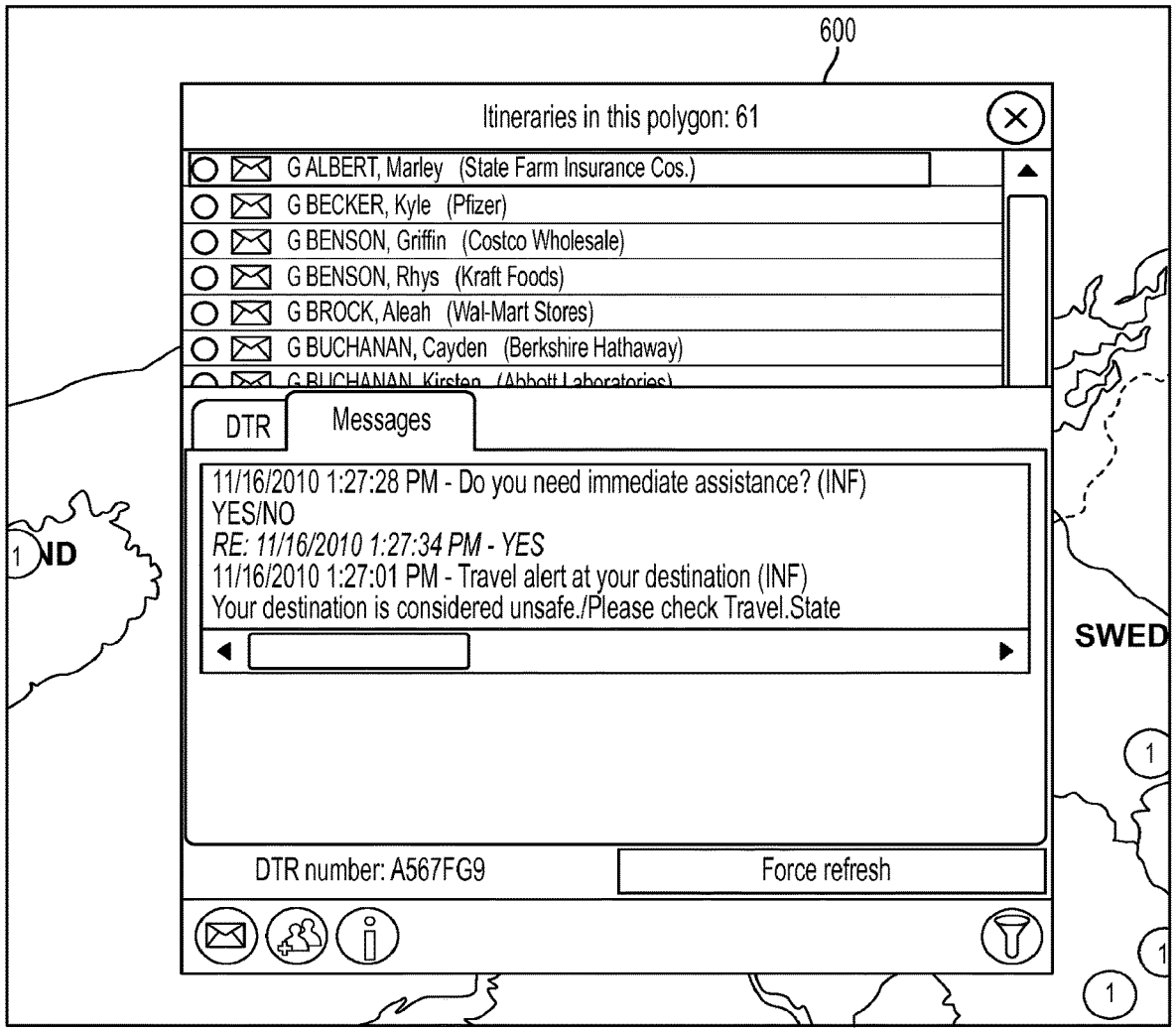

FIG. 15 is a second view of the polygon detail box of FIG. 14.

FIG. 16 is a schematic diagram of a communication management system according to a particular embodiment.

DETAILED DESCRIPTION

Various embodiments of the present invention will now be described more fully hereinafter with reference to the accompanying drawings, in which various embodiments are shown. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

System Overview

A display screen associated with a communications management computer system according to particular embodiments is shown in FIGS. 6-9. As shown in these figures, the actual or approximate locations of a plurality of individuals (e.g., travelers or other individuals) are represented as "pushpin" indicia 420 on a geographical map 410. This allows a user (e.g., a travel agent or employer) to view the current location of each of a plurality of the individuals.

In various embodiments, each individual's current location may be based, for example, on a geocoded electronic version of the individual's travel itinerary, or location information that is received (e.g., in real time) from a location determination device associated with the individual (e.g., a cellular phone, tablet computer, laptop computer, GPS enabled watch, Smart Tag, or any other device suitable for tracking the location of an individual).

In particular embodiments, the system is adapted to allow users to select (e.g., simultaneously or in sequence) a plurality of individuals and then send all of (or substantially all of) the selected plurality of individuals a message. For example, a travel agency representative may select a large number of travelers in a particular area by creating a polygon, on a computer display screen, that surrounds visual representations of those travelers. The travel agency representative may then prepare and send a particular message to all of the selected travelers (e.g., through a single send action, such as selecting a single "send message" button on a computer display screen). This message may, for example, communicate and/or request information regarding the individual or the individual's travel itinerary. In various embodiments, the message may include: (1) a request for information; and (2) a pre-defined list of possible responses that the individual may use to answer the request. As discussed in greater detail below, this may allow a user to efficiently manage the needs of the various individuals in the group through an automated, electronic triage process.

The messaging system may also allow each individual to provide information regarding their current location (e.g., by providing access to their current geo-location as determined by the individual's portable computing device). This may help the system to more accurately track the individual's location. Various additional aspects of the system are discussed in greater detail below.

Exemplary Technical Platforms

As will be appreciated by one skilled in the relevant field, the present invention may be, for example, embodied as a computer system, a method, or a computer program product. Accordingly, various embodiments may take the form of an entirely hardware embodiment, an entirely software embodiment, or an embodiment combining software and hardware aspects. Furthermore, particular embodiments may take the form of a computer program product stored on a computer-readable storage medium having computer-readable instructions (e.g., software) embodied in the storage medium. Various embodiments may take the form of web-implemented computer software. Any suitable computer-readable storage medium may be utilized including, for example, hard disks, compact disks, DVDs, optical storage devices, and/or magnetic storage devices.

Various embodiments are described below with reference to block diagrams and flowchart illustrations of methods, apparatuses (e.g., systems) and computer program products. It should be understood that each block of the block diagrams and flowchart illustrations, and combinations of blocks in the block diagrams and flowchart illustrations, respectively, can be implemented by a computer executing computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner such that the instructions stored in the computer-readable memory produce an article of manufacture that is configured for implementing the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of mechanisms for performing the specified functions, combinations of steps for performing the specified functions, and program instructions for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and other hardware executing appropriate computer instructions.

Exemplary System Architecture

FIG. 1 shows a block diagram of a Communication Management Computer System 10 according to one embodiment. As may be understood from this figure, the Communication Management Computer System 10 includes a Communications Management Computer Server 50, one or more computer networks 20, 35, a Messaging Service 25, and a plurality of User Computer Devices 14, 16 (e.g., a plurality of wireless devices, such as smart phones, that are each associated with a particular individual). The one or more computer networks 20, 35 facilitate communication between the User Computer Devices 14, 16, the Messaging Service 25, and the Communications Management Computer Server 50. These one or more computer networks 20, 35 may include any of a variety of types of computer networks such as the Internet, a private intranet, a public switch telephone network (PSTN), or any other type of network known in the relevant field.

FIG. 2 is a block diagram of an exemplary embodiment of the Communications Management Computer Server 50 of FIG. 1. The Communications Management Computer Server 50 includes a processor 60 that communicates with other elements within the Communications Management Computer Server 50 via a system interface or bus 61. Also included in the Communications Management Computer Server 50 is a display device/input device 64 for receiving and displaying data. This display device/input device 64 may be, for example, a keyboard, voice recognition, or pointing device that is used in combination with a monitor. The Communications Management Computer Server 50 further includes memory 66, which preferably includes both read only memory (ROM) 65 and random access memory (RAM) 67. The server's ROM 65 is used to store a basic input/output system 68 (BIOS) that contains the basic routines that help to transfer information between elements within the Communications Management Computer Server 50.

In addition, the Communications Management Computer Server 50 includes at least one storage device 63, such as a hard disk drive, a floppy disk drive, a CD Rom drive, or optical disk drive, for storing information on various computer-readable media, such as a hard disk, a removable magnetic disk, or a CD-ROM disk. As will be appreciated by one of ordinary skill in the field, each of these storage devices 63 is connected to the system bus 61 by an appropriate interface. The storage devices 63 and their associated computer-readable media provide nonvolatile storage for the Communications Management Computer Server 50. It is important to note that the computer-readable media described above could be replaced by any other type of computer-readable media known in the art. Such media include, for example, magnetic cassettes, flash memory cards, digital video disks, and Bernoulli cartridges.

A number of program modules may be stored by the various storage devices and within RAM 67. Such program modules include an operating system 80, a Display and Individual Selection Module 100, a Messaging Module 200 and a Location Determination Module 300. The Display and Individual Selection Module 100, Messaging Module 200 and Location Determination Module 300 control certain aspects of the operation of the Communications Management Computer Server 50, as described in more detail below, with the assistance of the processor 60 and an operating system 80.

Also located within the Communications Management Computer Server 50 is a network interface 74 for interfacing and communicating with other elements of a computer network. It will be appreciated by one of ordinary skill in the field that one or more of the Communications Management Computer Server 50 components may be located geographically remotely from other Communications Management Computer Server 50 components. Furthermore, one or more of the components may be combined, and additional components performing functions described herein may be included in the Communications Management Computer Server 50.

System Users—Examples

The communications management computer system may be used in a wide variety of different contexts, but it is particularly useful within the context of communicating with large numbers of travelers as they complete their individual travel itineraries. Within this context (and other contexts), in various embodiments, multiple different entities may use the system to monitor, and/or communicate with, any particular traveler or group of travelers (or other individuals). For example, a large, international travel agency may use the system to monitor, and communicate with, tens of thousands of travelers as each traveler completes a travel itinerary generated by the travel agency. At the same time, a multinational corporation may use the system to track and communicate with its traveling employees. In this example, in various embodiments, the international travel agency would be able to track and communicate with travelers for which the travel agency issued travel itineraries. Similarly, the multinational corporation would be able to use the system to track and communicate with employees of the multinational corporation.

As may be understood from the travel-related example above, in various embodiments, the system may be adapted to allow a plurality of entities (e.g., 2, 3, 4, or more) entities to simultaneously track, and communicate with, any particular individual. In certain embodiments, the system is adapted to allow two or more entities to view any correspondence between the entities and individuals that the entities are monitoring. As an example, consider a case in which Microsoft uses the system to track and communicate with all traveling Microsoft employees whose travel arrangements were made through the American Express travel agency. In this example, both American Express and Microsoft would be able to use the system to track the location of, and communicate with, the various Microsoft employees who made their travel arrangements through American Express. American Express and Microsoft would also be able to monitor any messages communicated, through the system, between American Express, Microsoft, and/or each of the traveling Microsoft employees.

Although this example focuses on monitoring and communicating with traveling individuals, it should be understood that the system may be used in a variety of different contexts, such as within the context of coordinating the activities of: (1) the various drivers of fleets of trucks or other vehicles (e.g., taxi drivers or bus drivers); (2) non-traveling employees; (3) pilots; (4) members of the military; or (5) any other suitable type of individual.

Messaging Functionality

In particular embodiments, the system is adapted to send messages to individuals on a variety of different platforms. For example, the system may send messages to an individual's cell phone, tablet computer, laptop, GPS watch, or other suitable portable computing device. Messages may be sent, for example, as one-way messages (e.g., messages that are not adapted to illicit a response from the individual and/or that are configured to not allow an individual to respond).

In other examples, two-way messages may be sent to the individual. In certain embodiments, such two-way messages limit the individual's responses to any of a plurality of pre-defined (e.g., multiple-choice) responses. For example, a message sent out to all individuals who were booked on a flight that has been cancelled late in the day might include: (1) a message indicating that the flight has been cancelled; and (2) an invitation to respond to the message by selecting one of the following multiple choice options: (A) change my reservation to the next available flight; (B) reserve a room for me at a nearby hotel and change my reservation for the first available flight tomorrow; (C) cancel my flight and reserve a rental car in my name; or (D) have a travel specialist call me to coordinate other travel arrangements. The individual would then respond by selecting A, B, C, or D on the individual's portable computing device to indicate which of the options they would like to choose.

As noted above, in various embodiments, the system is configured to allow a user (e.g., a representative of a company, travel agency, or other entity that is tracking and communicating with a large number of individuals) to select a plurality of individuals on the user's display screen in any suitable manner. As shown in FIGS. 6-7, in a particular example, the user may select a plurality of individuals by creating a polygon 430 around indicia 420 that visually represent the individuals. (The user may create the polygon, for example, by using a computer mouse to define the various corners of the polygon, or in any other suitable manner.) The user may then use the system to generate and send a suitable message (e.g., a common message) to all of the selected individuals (e.g., to all of the individuals that are represented by indicia 420 that are positioned within the area defined by the polygon 430). This functionality may be particularly useful if all individuals in a particular area are affected by a common event (e.g., by a natural disaster or a large-scale terrorist threat).

As shown in FIGS. 3 and 4, in particular embodiments, the system functionality described above may be executed by a Display and Individual Selection Module 100 and a Messaging Module 200 that are executed by the system. Turning to FIG. 3, the Display and Individual Selection Module 100 begins at Step 102, where it displays a geographical map on a computer display screen associated with the system. The system then advances to Step 104 where it displays a first icon in a first location on the map, the first icon representing at least a first particular individual, and the first location on the map corresponding at least generally to the current physical location of the first particular individual. The system then progresses to Step 106 where it displays a second icon in a second location on the map, the second icon representing at least a second particular individual, and the second location on the map corresponding at least generally to the current physical location of the second particular individual. At Step 108, the system then allows the user to select a group of icons that include both the first and second icon.

Next, the system may execute a Messaging Module 200 to allow the user to send a particular message to the users selected at Step 108. In particular, as shown in FIG. 4, at Step 205, the system allows the user to send a common message to: (A) a first portable computing device associated with the first individual; and (B) a second portable computing device associated with the second individual. This may be done, for example, by simultaneously sending a single text or e-mail message to the first and second individual's computing devices (e.g., their laptop computers, tablet computers, or smart phones). It should be understood that, although the example above describes simultaneously sending a single message to two users, the message may be directed to any suitable number of users.

In various embodiments, the user may define the recipient list for particular messages in ways other than forming a polygon around indicia that correspond to specific individuals. For example, rather than selecting the individuals on a computer display screen, the user may specify certain criteria and use the system to transmit a particular message to any individuals that satisfy those criteria. For example, the user may use the system to send a particular message to all individuals that were scheduled to depart from Heathrow airport on a particular day.

The system may determine which individuals satisfy particular criteria based on information stored in the system's memory for the individual. For example, the system may store an electronic itinerary for particular individuals and use these itineraries (or other information) to determine which of the individuals satisfy certain specific criteria. Examples of such criteria include: (1) the individual's present location; (2) the individual's travel information (e.g., the individual's flight information); (3) the particular hotel where the individual is staying; (4) the individual's employer; (5) the individual's frequent traveler rating; and (6) any other suitable information.

In particular embodiments, the system is adapted to allow the user to send a common message to all of the selected users by executing a single action or series of actions. For example, in a particular embodiment, the user may create and send a message by typing the message into a text entry box on a display screen and then selecting a "send" button. The system would then send the message to all of the selected users.

The system may be adapted to use the individuals' various responses in any of a variety of different ways. For example, the system may automatically change the status of an individual to reflect the content of a response received from the individual. For example, if the individual requested, in their response, to be contacted by a customer service representative, the individual's status may be changed to a "critical" status. Similarly, if the individual requested to have their reservation changed to the next available flight, the individual's status may be changed to "uncritical" (which may indicate that the individual does not require immediate attention from a customer service representative).

In particular embodiments, the system may automatically change the appearance of an icon that corresponds to an individual to reflect the individual's current status. For example, the system may change the color of a pushpin indicia 420 that corresponds to a particular individual to red in response to the individual indicating that the individual wishes to be contacted by a customer service representative (e.g., that the individual is in "critical" status). The system may then change the color of the individual's pushpin indicia 420 to another color (e.g., green) once the individual's immediate issues have been addressed and the individual is in "non-critical" status. FIGS. 10 and 11 depict the use of different colors to differentiate the various different pushpin indicia based on the status of the individuals that are represented by the pushpin indicia. In these figures, different colors are represented by different hash patterns.

As shown in FIG. 10, the names of the individuals represented by pushpins on the map may be displayed in a list format along with a color coded indicator 440A, 440B, 440C, 440D, 440E, 440F indicating the individual's current status. The system may be adapted to allow a user to send a message to any particular individual by selecting an icon (e.g., an envelope icon) that is next to the individual's name in the list of names.

In another example, the system may use a response from a particular individual to update the individual's location within the system. For example, if the system transmits a message to an individual asking for the individual's permission to obtain the individual's longitude and latitude via the GPS functionality of the individual's cell phone, and if the individual responds affirmatively, the system may receive the individual's current longitude and latitude information and use this information as the individual's current position. Alternatively, the individual may provide advance authorization to use data from their cell phone to determine the individual's location.

Filtering Functionality

In particular embodiments, the system may be adapted to allow users to filter the data of various individuals based on any suitable criteria (e.g., based on the individual's travel status, company affiliation, frequent traveler rating, or any other suitable criteria). For example, the system may allow users to only view "push-pin" indicia for individuals who have requested to be contacted by a customer service representative. This type of filtering functionality may, for example, facilitate delivering service to the individuals who need immediate attention.

"Sticky" Polygon Functionality

In various embodiments, the system may be adapted to allow users to: (A) define an area on a map displayed on one of the system's display screens; and then (B) use the system to automatically collect information regarding activity that occurs within the defined area over time. For example, the system may allow a user to define a particular area on a map display by using a mouse to create a polygon that defines the boundaries of the particular area. The user may then set up data monitoring criteria for that particular polygon. For example, the user may request that the system monitor, and save to memory, the number of individuals tracked by the system who travel (and/or will travel) into the defined area over a certain period of time.

The system may do this, for example: (1) by analyzing all the travel itineraries that it has stored in memory for the period of time at issue; and (2) based on this analysis, determining which travel itineraries will cause an individual to travel within the particular area during the period of time at issue. In various embodiments, the user can filter the results of such an analysis based on any suitable criteria (e.g., by the employer or by nationality of the individuals at issue).

The results of this analysis may be used in a variety of different ways. For example, the information can be used to predict the number of individuals, tracked by the system, that will travel through a particular geographical area in any particular upcoming period of time. This information can be useful in coordinating the availability of resources in local crisis centers (especially for crises, such as severe snow storms, that are predictable).

In certain embodiments, the system may allow users to define the areas described above so that the defined areas are persistent on a private, internal, or public level. In various embodiments, the user may define whether the defined area and related data are visible only to the creator/owner of the defined area, other internal users (e.g., other agents) and/or all users of the system.

Additional Automated Functionality

In particular embodiments, the system may include an "autopilot" feature, which allows users to set up rules regarding how itineraries that satisfy certain criteria will be handled by the system. For example, users may configure the system to automatically send a predefined message to individuals who are members of a particular group, or whose travel itineraries pass through a particular area.

Positioning of Push-Pin Indicia on Map

As discussed above, in particular embodiments, the system is adapted to store, in memory (e.g., in a database associated with the system) a current geographical location for each particular individual. This geographical location may be determined in any suitable manner.

In a particular embodiment, the individual's approximate geographical location may be determined by a "smart" itinerary importer/analyzer, which is adapted to use the individual's current travel itinerary to determine the individual's current approximate location. For example, if an individual is specified to arrive at LaGuardia airport at 4:00 pm on Dec. 1, 2010, then on Dec. 1, 2010 at 4:00 pm, the system would change the individual's location to the geocoded location of LaGuardia airport (e.g., a particular longitude and latitude that is associated with the address of LaGuardia airport in the system's database). Similar techniques may be used with other types of locations that are included, for example, on standard travel itineraries (e.g., rental car pickup locations, hotels, train stations, bus stations, entertainment venues, etc. . . . )

In particular embodiments, if a particular individual is associated with multiple itinerary locations (or other location data) on a particular date at a particular time, the system may be adapted to apply logic to automatically determine which itinerary location most accurately represents the individual's true location. The system may then use this itinerary location as the individual's location for that particular date and time. In a particular embodiment, the system would use the following locations in the listed order of preference (as listed from most accurate to least accurate): (1) the GPS location determined by the individual's portable computing device (e.g., the individual's cell phone); (2) the location of the individual's current hotel; (3) the location of an airport that the individual recently visited; and (4) the location of a rental car branch recently visited by the individual.

Consider, for example, a situation in which an individual's itinerary indicates that the individual is scheduled to: (1) arrive at Frankfurt am Main airport at 9:00 am on December 1; (2) pick up a rental car at a local Hertz location after 10:00 am on December 1, and then check into the "Hotel Rheinland" hotel in Bad Godesberg after 3:00 pm. If no other location information for the individual is available, the system will list the individual's location at 4:00 pm on December 1 as the geocoded location of the Hotel Rheinland hotel in Bad Godesberg (which may be obtained, for example, from a database of geocoded address information). From the example above, it should be understood that, in various embodiments, the system will automatically and dynamically determine the individual's location in real time based, at least in part, on the individual's travel itinerary.

In particular embodiments, the system's Location Determination Module 300 may be used to execute the functionality described above. For example, turning to FIG. 5, the Location Determination Module 300 may begin at Step 305, where it receives an individual's current travel itinerary (e.g., an electronic version of the individual's travel itinerary.) The system then advances to Step 310, where it automatically approximates the individual's current location based, at least in part, on the individual's current travel itinerary.

Agent Collaboration

Various embodiments of the system include agent collaboration features that allow system agents (e.g., travel agents) to: (1) communicate with other system agents directly (e.g., via text messages); (2) broadcast messages to groups of system agents; and/or (3) forward itineraries to other agents for further action (e.g., for communication, trouble shooting, or re-booking purposes). System agents may be allocated in any suitable manner known in the relevant field, and may be assigned to teams for efficiency purposes.

Exemplary Dataflow

It should be understood that any suitable computer system may be used to implement particular embodiments of the invention. One such computer system is shown schematically in FIG. 16, which shows various system components and the related dataflows in somewhat greater detail.

Additional Discussion of Various Embodiments

The following text discusses various embodiments of the system in additional detail. It should be understood that the discussion provided herein is exemplary in nature, and is not intended to limit the scope of the disclosed inventions in any way.

Terminology:
  MCM=Mobile Communication Management system
  TMC=Travel Management Company utilizing MCM
  Customer=customer of TMC using travel related services from TMC
  Traveler=employee of customer being on business trip Preconditions of various embodiments:
  MCM has itinerary data from TMC loaded into its database and receives regular updates per itinerary if needed.
  TMC is equipped with MCM and has a group of agents using the MCM client. This group of agents has a supervisor and several agents.
  Customer has access to MCM client to access itinerary information of their own employees.
  Employees are equipped with smart phones running the MCM smart phone client.

Abstract description of particular embodiments of MCM:
  displays itineraries on a global map based on either geocoded itinerary data or real location information of the traveler's smart phone.
  displays updates of itineraries in real-time (change of flight or itinerary status or other incoming information).
  filters displayed itineraries based on user role (e.g., customer only sees own employees' itineraries, whereas supervisor sees all itineraries of TMC).
  MCM allows dynamic creation of groups and grouping itineraries into those groups for organizational purposes.
  MCM allows to search for itinerary specific criteria to identify an itinerary or a set of itineraries (e.g., company search or search by airline or flight number).
  MCM may send messages to travelers on itinerary one way to inform the traveler about specific circumstances (e.g., a catastrophe).
  MCM may send feedback requests to travelers on itinerary expecting responses from the traveler, like a request for a location update, or feedback if a traveler needs help).
  MCM may automatically change the status and the visual representation on the map based on the feedback to allow for easy filtering down to travelers in need.
  MCM allows for clustering of itineraries.
  MCM allows for the group of itineraries on a map by drawing a polygon on the map.
  MCM will show to all users real time information about itinerary data, status updates and communication between MCM user and traveler.

Example

A travel alert comes up informing about a major travel impact in northern Europe due to volcanic ashes produced by a volcano in Iceland.

TMC supervising agent utilizes the MCM client and locates all itineraries on the map displayed within a polygon around northern Europe. Depending on the number of itineraries, the supervising agent might create subgroups and assign them to individual agents which also run the MCM client, but who only see assigned itineraries.

At the same time, the customers get the news of the volcano ash and retrieve information from the MCM client indicating which of their employees are within the critical area. The customer can either send an initial message to their employees advising them of the incident and letting the travelers know that they will be taken care of, or just observe the action the TMC agents take and monitor the status of the travelers.

Initially all travelers are in a "neutral" status as it is not known if they really need immediate help. FIG. 6 shows itinerary pushpins 420 on the map, with a polygon 430 around Iceland and northern Europe as well as a group in the left-hand pane of all travelers within the polygon 430.

FIG. 12 depicts the messaging functionality where the user can send out a message to either some or all members of the group. Messages can be defined freely or derived from a template. As shown in the messaging box 500 in FIG. 12, feedback messages may include a question like "Do you need immediate assistance?" and a set of answering options for the traveler (e.g., "Yes" and "No"). Each option can be combined with an automatic status change of the itinerary upon receipt of an answer. For example, if an individual responds with "YES" to the question "Do you need immediate assistance?", the system may change the status of the individual's itinerary to critical and the color the individual's pushpin indicator to red, whereas an answer of "NO" would result in the system setting the status of the individual's itinerary to uncritical and the color of the individual's pushpin indicator to green.

Also, the system may send a request to an individual to provide data regarding the individual's actual location (e.g., via GPS functionality on the individual's smart phone). A YES answer to this question may result in the system receiving GPS data regarding the individual's current location. The system may then reposition the pushpin indicator that corresponds to the individual on the map to the individual's actual longitude/latitude position. In our example, the system is configured so that a response to a location request will result in changing the color of the individual's pushpin indicator to yellow to indicate that the system received feedback from the individual.

After receiving some answers from travelers, the screen may, for example, appear as shown in FIG. 10.

In various embodiments, the agent and the customer can easily identify the status of each individual traveler and focus on a group of travelers truly in need of help, without spending a lot of time with phone calls and blocking call center lines. In particular embodiments, once an itinerary is classified, it is up to the agent or company to decide whether to send more messages, like "Do you want us to: (a) book another flight; (b) extend your hotel; (c) reserve you a seat on a train; or (d) call you to discuss appropriate travel arrangements.

In particular embodiments, the user can easily view the critical itineraries by using a filtering process to hide all other, non-critical itineraries to allow a better overview of where help is needed.

In various embodiments, MCM provides the user with sufficient information about the itinerary data or the communication history as shown in FIGS. 14 and 15. In particular embodiments, all information is consistent among all active MCM clients due to an infrastructure which updates the MCM client in real time.

The above scenario provides a simple example of how to use MCM to quickly identify travelers in need, communicating with them to make them aware that somebody is taking care and to break down from a large number of travelers affected to the travelers who really need assistance in a very short period of time.

Typically there is more than just one travel warning or incident globally. This is one reason why MCM, in particular embodiments, allows for multiple groups and for assigning groups to individual agents to break down the amount of mobile communication management to be done.

Additional Features

Various embodiments of the systems described above may include Auto-Messaging and/or Locked-In features. These features are discussed in greater detail below.

Auto-Messaging

In particular embodiments, the system may be adapted to automatically transmit one or more messages to an individual in response to one or more predetermined criteria being satisfied. Such criteria may include, for example, the present location of an individual matching a specified location. The individual's location may be determined, for example, based on: (1) the individual's itinerary (e.g., the individual's scheduled location as determined from their current itinerary); (2) location information received from the individual's GPS-enabled portable computing device; (3) an electronic indication that the individual has reached a particular destination—e.g., an indication that the individual has checked into a particular hotel, or checked in for a particular flight; and/or (4) any other suitable method of determining an individual's location.

The criteria may be rule-based and may include any of a variety of different criteria. As a particular example, the system may include pre-determined instructions indicating that all employees of IBM must call their supervisor upon arrival at a particular destination. In such an embodiment, the system may be adapted to automatically send a message to traveling IBM employees (e.g., via a text or e-mail message to be read on the employee's smartphone) upon arrival at their destination. The message may remind them to call their supervisor.

As a further example, the system may remind business travelers who are employed by Google to, upon completion of their current travel itinerary, submit an expense reimbursement form for their trip.) In such an embodiment, the system may be adapted to automatically send a message to the traveler upon completion of their travel itinerary reminding them to complete a suitable travel expense form.

In particular embodiments, the system may be adapted to facilitate bi-directional auto messaging. For example, the system may be adapted to automatically transmit a message from a traveler's handheld device to a particular message recipient (e.g., the traveler's employer) at least partially in response to certain criteria being specified (e.g., the traveler reaching a particular location or satisfying other criteria). In other embodiments, the system may be adapted to initiate a dialog between two users when a particular user satisfies one or more specified criteria (e.g., the user arrives at a particular airport, or rents a car).

Locked-In Feature

In particular embodiments, the system may be adapted to allow a user to "lock in" to a particular location in order to receive (and/or continue to receive) messages that are specific to the particular location. For example, a user who is traveling first to Paris, and then to Frankfurt, and then back to Paris, may lock in to Paris when they first arrive in Paris. When the user later travels to Frankfurt, the user will continue to receive any messages that are intended for individuals who are currently located in Paris. This may, for example, prepare the traveler for their later return to Paris by keeping them apprised of Paris-specific events.

In particular embodiments, a user may "lock in" to a particular geographical region by specifying the geographical boundaries of the geographical area that they wish to be locked into. For example, the user may use a computer device to draw a polygon on a map, and then request to be locked into the geographical area defined by the polygon. In other embodiments, users may be manually or automatically locked into various points of interest (e.g., a particular hotel), which may be done, for example, by specifying a geocoded or conventional address for the location.

Conclusion

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended exemplary concepts. Although specific terms are employed herein, they are used in a generic and descriptive sense only and not for the purposes of limitation.

We claim:

1. A system comprising:
    a processor; and
    a computer-readable storage medium comprising instructions that, upon execution by the processor, cause the system to perform operations, the operations comprising:
        retrieving geocoded itinerary data from a database storing an electronic itinerary for a traveler while traveling during a period of time;
        determining, based on the geocoded itinerary data, an itinerary location that represents a physical location of the traveler during the period of time;
        estimating a current location of the traveler during the period of time based on the geocoded itinerary data and the determined itinerary location while lacking access to location determination device data associated with the traveler; and
        sending an automatic feedback message to a portable device of the traveler when the estimated current location of the traveler enters a defined geographical region within the period of time, wherein the automatic feedback message comprises a selectable option that, when selected by the traveler, is configured to provide an automatic status change of the electronic itinerary.

2. The system of claim 1, wherein the instructions, when executed, further cause the system to perform additional operations, the additional operations comprising:
    receiving a lock-in message from the traveler that identifies a particular location; and
    sending messages to the traveler that are designated for travelers physically proximate to the particular location without regard to a respective estimated current location of the traveler.

3. The system of claim 2, wherein the lock-in message includes geographical boundaries that define a geographical area for identifying the particular location.

4. The system of claim 2, wherein the lock-in message includes a geocoded or conventional address for identifying the particular location.

5. The system of claim 1, wherein the instructions, when executed, further cause the system to perform additional operations, the additional operations comprising:
   filtering the geocoded itinerary data based a filter criterion to exclude a subset of the geocoded itinerary data.

6. The system of claim 5, wherein the filter criterion includes a company affiliation, a travel status, or a frequent traveler rating.

7. The system of claim 1, wherein the instructions, when executed, further cause the system to perform additional operations, the additional operations comprising:
   aggregating information concerning activity by the traveler that occurs within the defined geographical region.

8. The system of claim 1, wherein the electronic itinerary associates the traveler with a plurality of locations at a given time, and wherein estimating the current location of the traveler comprises:
   defining one of the plurality of locations as the estimated current location based on a probability associated with each of the plurality of locations.

9. A method comprising:
   retrieving geocoded itinerary data from a database storing an electronic itinerary for a traveler while traveling during a period of time;
   determining, based on the geocoded itinerary data, an itinerary location that represents a physical location of the traveler during the period of time;
   estimating a current location of the traveler during the period of time based on the geocoded itinerary data and the determined itinerary location while lacking access to location determination device data associated with the traveler, wherein the estimated current location is based on determining an itinerary location that most accurately represents a physical location of the traveler during the period of time; and
   sending an automatic feedback message to a portable device of the traveler when the estimated current location of the traveler enters a defined geographical region within the period of time, wherein the automatic feedback message comprises a selectable option that, when selected by the traveler, is configured to provide an automatic status change of the electronic itinerary.

10. The method of claim 9, further comprising:
    updating a status indicator associated with the traveler on a display based on a response to the automatic feedback message received from the traveler.

11. The method of claim 10, wherein a list entry associated with the traveler on the display includes the status indicator.

12. The method of claim 10, wherein an icon associated with the traveler includes the status indicator, the icon representing a respective estimated current location of the traveler on a geographical map presented on the display.

13. The method of claim 9, further comprising:
    presenting a geographical map on a display, the geographical map comprising an icon representing the estimated current location of the traveler on the geographical map.

14. The method of claim 13, further comprising:
    dynamically updating a position of the icon on the geographical map in real-time as the estimated current location is re-evaluated.

15. The method of claim 9, wherein the automatic feedback message is a one-way message that is incapable of directly eliciting a response from the traveler.

16. The method of claim 9, wherein the automatic feedback message is a two-way message that is capable of directly eliciting a response from the traveler.

17. The method of claim 16, wherein the two-way message includes a plurality of pre-defined responses for selection by the traveler.

18. A non-transitory computer-readable storage medium comprising computer-readable instructions that upon execution by a processor of a computing device cause the computing device to:
    retrieve geocoded itinerary data from a database storing an electronic itinerary for a traveler while traveling during a period of time;
    determine, based on the geocoded itinerary data, an itinerary location that represents a physical location of the traveler during the period of time;
    estimate a current location of the traveler during the period of time based on the geocoded itinerary data and the determined itinerary location while lacking access to location determination device data associated with the traveler, wherein the estimated current location is based on determining an itinerary location that most accurately represents a physical location of the traveler during the period of time; and
    send an automatic feedback message to a portable device of the traveler when the estimated current location of the traveler enters a defined geographical region within the period of time, wherein the automatic feedback message comprises a selectable option that, when selected by the traveler, is configured to provide an automatic status change of the electronic itinerary.

* * * * *

UNITED STATES PATENT AND TRADEMARK OFFICE
CERTIFICATE OF CORRECTION

| | | |
|---|---|---|
| PATENT NO. | : 11,388,121 B2 | |
| APPLICATION NO. | : 16/442364 | |
| DATED | : July 12, 2022 | |
| INVENTOR(S) | : Pfeffer et al. | |

It is certified that error appears in the above-identified patent and that said Letters Patent is hereby corrected as shown below:

On the Title Page

(71) Applicant:
"Charter Solutions International, Alpharetta, GA (US)"
Should be replaced with:
--Amadeus North America, Inc., Doral, FL (US)--

Signed and Sealed this
Fifth Day of September, 2023

Katherine Kelly Vidal
*Director of the United States Patent and Trademark Office*